UNITED STATES PATENT OFFICE 2,529,924

MONOAZO COMPOUNDS CONTAINING A 4-HYDROXYQUINOLONE-2 GROUP

Joseph B. Dickey, Rochester, N. Y., assignor to Eastman Kodak Company, Rochester, N. Y., a corporation of New Jersey No Drawing. Application January 7, 1948, Serial No. 1,065

4 Claims. (Cl. 260—155)

This invention relates to new monoazo compounds containing a 4-hydroxyquinolone-2 group which are valuable in the art of dyeing or coloring. Textile materials made of or containing a cellulose alkyl carboxylic acid ester having two to four carbon atoms in the acid groups thereof are colored fast yellow shades by the new compounds using convenient coloring methods well-known in the art.

The cellulose alkyl carboxylic acid esters which can be colored with the azo compounds of my invention include both hydrolyzed and unhydrolyzed cellulose acetate, cellulose propionate, cellulose butyrate, cellulose acetate-propionate, and cellulose acetate-butyrate. While the invention will be illustrated more particularly in connection with the coloration of cellulose acetate textile materials it will be understood that it is applicable to the coloration of the other cellulose alkyl carboxylic acid esters indicated above.

Certain azo dye compounds embraced by the general formula:

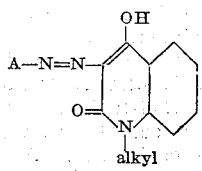

wherein A represents the residue of an aromatic nucleus are not new. A number of azo compounds having this general formula have been prepared and tested. While the fastness to light and gas of the dyeings obtained with some of these compounds on cellulose acetate textile materials is good, it has been found that when wet or damp cellulose acetate material colored with one of these dyes is hot-pressed or steamed, the dye is sublimed or marked off the fabric. This fault definitely limits the use in the textile industry of dyes of this type.

Accordingly, it is an object of my invention to provide new azo dye compounds containing a 4-hydroxyquinolone-2 nucleus. It is a further object of my invention to provide new yellow dyes for the coloration of the aforesaid cellulose alkyl carboxylic acid ester textile materials which are of good fastness to light, gas, and washing, and are free from the fault of subliming or marking off when steamed or hot-pressed. Another object is to provide a satisfactory process for preparing my new compounds.

The new compounds by means of which the foregoing objects are accomplished or made possible have the formula:

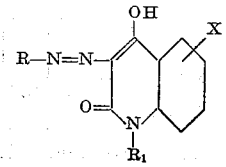

wherein R represents the residue of a monocyclic, non-sulfonated, aromatic nucleus of the benzene series, $R_1$ represents a hydroxyalkyl group having two to three, inclusive, carbon atoms, an alkoxyalkyl group having three to four, inclusive, carbon atoms, the $\beta$-carboxamidoethyl group, the $\beta$-carbomethoxyethyl group, or the $\beta$-carboethoxyethyl group, and X stands for a hydrogen atom, a chlorine atom, a bromine atom, a methyl group, a methoxy group, a trifluoromethyl group, or a nitro group.

The azo dye compounds of my invention are prepared by diazotizing a diazotizable monocyclic, non-sulfonated, aromatic amine of the benzene series and coupling the diazonium compound formed with a 4-hydroxyquinolone-2 compound having the formula:

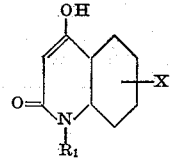

wherein $R_1$ and X have the meanings previously assigned to them. The coupling reaction is carried out in aqueous alkaline solution following which the reaction mixture is neutralized and the dye compound is recovered by filtration, washed with water, and dried.

The following examples illustrate the azo dye compounds of my invention and the manner in which they may be prepared.

Example 1

50 cc. of sulfuric acid (95–96%) are placed in a 500 cc. flask fitted with an agitator and a thermometer. 7.6 grams of dry sodium nitrite are added slowly with vigorous stirring to the sulfuric acid over a period of about one minute during which the temperature of the mixing rises to 70–75° C. After cooling the resulting mixture to 12–14° C., 120 cc. of cold acetic acid are added, with stirring, while maintaining a temperature below 20° C. 16.3 grams of o-nitro-p-cyanoaniline are then added with continuous stirring and cooling. A clear yellow solution results, and diazotization is complete when a drop of solution dissolves completely in a small beaker of water.

20.5 grams of N-β-hydroxyethyl-4-hydroxyquinolone-2 are dissolved in 200 cc. of water containing 30 grams of sodium carbonate, and the resulting solution is cooled to 0°–10° C. The diazo solution prepared as described above is slowly added with stirring and concurrently with its addition an aqueous solution of sodium hydroxide is added in sufficient amount to maintain the reaction mixture slightly alkaline. A temperature of 0–10° C. is maintained throughout the reaction which takes place. Upon completion of the coupling reaction the mixture is made acid to litmus by the addition of hydrochloric acid, and the dye compound formed is recovered by filtration, washed free of salts with water, and dried. The dye compound has the formula:

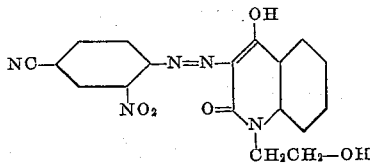

and colors cellulose acetate yellow shades.

*Example 2*

13.8 grams of m-nitroaniline are dissolved in 150 cc. of water to which has been added 25 cc. of 36% hydrochloric acid and the resulting solution is cooled to 0–10° C. by the addition of ice. The m-nitroaniline is diazotized by adding with stirring, 6.9 grams of sodium nitrite dissolved in water while maintaining a temperature of 0–10° C.

20.5 grams of N-β-hydroxyethyl-4-hydroxyquinolone-2 are dissolved in 200 cc. of a solution of 30 grams of sodium carbonate. After cooling the resulting solution to 0–10° C., the diazonium solution prepared as described above is slowly added with stirring and further cooling. Upon completion of the coupling reaction which takes place, the mixture is rendered neutral to litmus by the addition of hydrochloric acid. The precipitated dye product is collected on a suction filter, washed with water, and dried. The dye compound obtained has the formula:

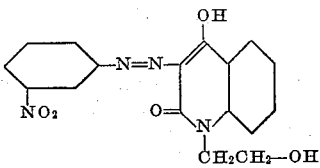

and colors cellulose acetate yellow shades.

By the use of 13.8 grams of p-nitroaniline in place of m-nitroaniline in the example just given, a dye compound is obtained which also colors cellulose acetate yellow shades.

*Example 3*

17.3 grams of o-nitro-p-chloroaniline are dissolved in 150 cc. of water containing 25 cc. of 36% hydrochloric acid. Diazotization is effected by adding to the resulting solution 6.9 grams of sodium nitrite dissolved in water while stirring and maintaining a temperature of 0–10° C.

20.5 grams of N-β-hydroxyethyl-4-hydroxyquinolone-2 are dissolved in 200 cc. of water containing 30 grams of sodium carbonate and the diazonium solution prepared as described above is slowly added with stirring while maintaining a temperature of 0–10° C. Upon completion of the coupling reaction which occurs, the mixture is made neutral to litmus by adding hydrochloric acid. The precipitated dye product is recovered by filtration, washed with water, and dried. The dye compound thus obtained has the formula:

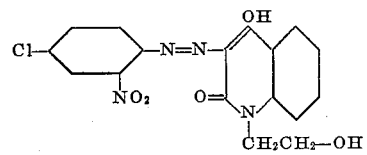

and colors cellulose acetate yellow shades.

*Example 4*

13.8 grams of m-nitroaniline are diazotized exactly as before and the diazonium solution thus obtained is added with stirring to an iced solution of 23.2 grams of N-β-carboxamidoethyl-4-hydroxyquinolone-2 in 200 cc. of water to which has been added 30 grams of sodium carbonate. When the coupling reaction which takes place is complete, the reaction mixture is made neutral to litmus by adding hydrochloric acid and the precipitated product is recovered by filtration, washed with water, and dried. The azo dye compound thus obtained has the formula:

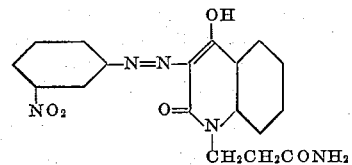

and colors cellulose acetate yellow shades.

*Example 5*

20.6 grams of 2-trifluoromethyl-5-nitroaniline are diazotized by adding 6.9 grams of sodium nitrite dissolved in water to an iced solution of the compound in 150 cc. of water containing 25 cc. of 36% hydrochloric acid.

The resulting solution of diazonium compound is slowly added with stirring to an iced solution of 20.5 grams of N-β-hydroxyethyl-4-hydroxyquinolone-2 in 200 cc. of water containing 30 grams of sodium carbonate. Upon completion of the coupling reaction which occurs, the mixture is made neutral to litmus by adding hydrochloric acid, and the precipitated product is recovered by filtration, washed with water, and dried. The azo dye compound obtained has the formula:

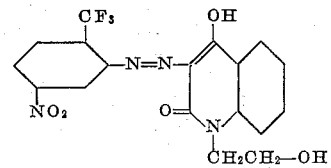

and colors cellulose acetate yellow shades.

*Example 6*

13.8 grams of m-nitroaniline are diazotized in accordance with the diazotization procedure described in Example 2 and the resulting solution of diazonium compound is slowly added with stirring to an iced soluton of 21.9 grams of N-β-hydroxypropyl-4-hydroxyquinolone-2 in 200 cc. of water containing 30 grams of sodium carbonate. Upon completion of the coupling reaction which occurs, the mixture is neutralized with hydrochloric acid, and the precipitated dye compound is recovered by filtration, washed with water, and dried. The dye compound obtained has the formula:

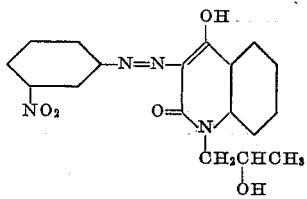

and colors cellulose acetate yellow shades.

*Example 7*

18.6 grams of 2-aminobenzene methylsulfonamide are dissolved in 150 cc. of water containing 25 cc. of 36% hydrochloric acid and diazotized by adding with stirring an aqueous solution of 6.9 grams of sodium nitrite while maintaining a temperature of 0–10° C.

26.5 grams of N-β,γ-dihydroxypropyl - 4 - hydroxy-8-methoxyquinolone-2 are dissolved in 200 cc. of water to which has been added 30 grams of sodium carbonate. To the resulting solution is added the solution of diazonium compound prepared as described above. The addition is carried out with stirring and cooling to maintain a temperature of 0–10° C. Upon completion of the coupling reaction which occurs, the mixture is made neutral to litmus by adding hydrochloric acid, and the precipitated dye compound is recovered by filtration, washed with water, and dried. The dye compound obtained has the formula:

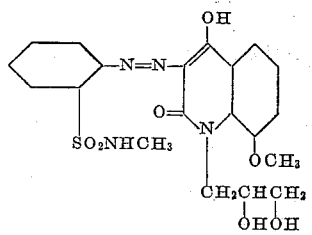

and colors cellulose acetate yellow shades.

*Example 8*

A. 18.3 grams of 3,5-dinitroaniline are dissolved in 225 cc. of hot glacial acetic acid and the resulting solution is then cooled rapidly to room temperature.

B. 7.6 grams of sodium nitrite are dissolved in 55 grams of 100% sulfuric acid at 15° C. and the resulting solution is warmed to 70° C. following which it is cooled to 15–20° C.

The mixture prepared in B is added to the mixture prepared in A over a period of 30 to 45 minutes while stirring and maintaining a temperature of 15–20° C. Stirring is continued at room temperature for several hours and then one gram of urea is added to remove any excess nitrous acid.

23.3 grams of N-β-methoxyethyl-4-hydroxy-7-methylquinolone-2 are dissolved in 200 cc. of water to which has been added 31 grams of sodium carbonate and the resulting solution is cooled to a temperature of 1–10° C. by the addition of ice. The diazo solution prepared as described above is then added with stirring while concurrently adding sodium hydroxide solution in sufficient quantity to maintain the reaction mixture slightly alkaline. A temperature of 0–10° C. is maintained throughout the reaction which occurs. At the conclusion of the coupling reaction, the mixture is made acid to litmus by the addition of acetic acid, and the dye compound formed is recovered by filtration, washed with water, and dried. The dye compound obtained has the formula:

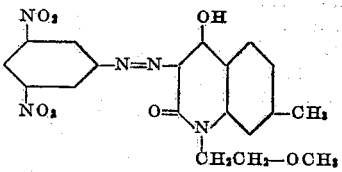

and colors cellulose acetate yellow shades.

*Example 9*

23.1 grams of 2-amino-5-nitrobenzene methylsulfonamide are diazotized by dissolving in 150 cc. of water containing 25 cc. of 36% hydrochloric acid and adding to the resulting solution 6.9 grams of sodium nitrite dissolved in water while stirring and cooling to maintain a temperature of 0–10° C.

26.1 grams of N-β-carboethoxyethyl-4-hydroxyquinolone-2 are added to 200 cc. of water containing 30 grams of sodium carbonate. To the resulting mixture is added the solution of diazonium compound prepared as described above while stirring and maintaining a temperature of 0–10° C. Upon completion of the coupling reaction which takes place, the mixture is made neutral to litmus by the addition of hydrochloric acid and the precipitated dye product is recovered by filtration, washed with water, and dried. The azo dye compound obtained has the formula:

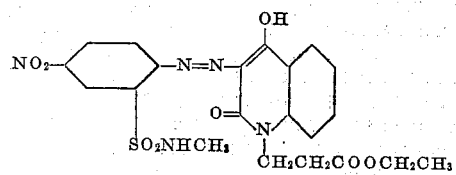

and colors cellulose acetate yellow shades.

*Example 10*

17.3 grams of 2-chloro-5-nitroaniline are dissolved in 150 cc. of water containing 25 cc. of 36% hydrochloric acid and diazotized by adding with stirring 6.9 grams of sodium nitrite dissolved in water while maintaining a temperature of 0–10° C.

25.4 grams of N-γ-hydroxypropyl-4-hydroxy-5-chloroquinolone-2 are dissolved in 200 cc. of water containing 30 grams of sodium carbonate. While maintaining a temperature of 0–10° C. in the reaction mixture the solution of diazonium compound prepared as described above is slowly added with stirring. A coupling reaction takes place at the completion of which the mixture is made neutral to litmus by adding hydrochloric acid. The precipitated dye product is recovered by filtration, washed with water, and dried. The azo dye compound obtained has the formula:

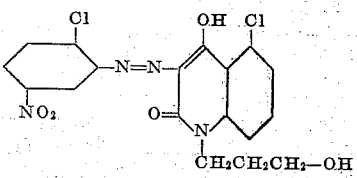

and colors cellulose acetate yellow shades.

Example 11

17.1 grams of 2-aminophenylmethyl sulfone are diazotized by dissolving in 150 cc. of water containing 25 cc. of 36% hydrochloric acid and adding to the resulting solution while stirring and cooling to 0–10° C. 6.9 grams of sodium nitrite dissolved in water.

30.2 grams of N-β-ethoxyethyl-4-hydroxy-7-trifluoromethylquinolone-2 are dissolved in 200 cc. of water containing 30 grams of sodium carbonate. To the resulting solution after cooling to 0–10° C. is added the diazonium solution prepared as described above. Constant agitation and cooling are continued until the coupling reaction is complete and the reaction mixture is neutralized with hydrochloric acid. The precipitate is then collected on a suction filter, washed with water, and dried. The azo dye compound obtained has the formula:

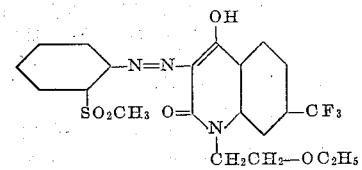

and colors cellulose acetate yellow shades.

Example 12

15.2 grams of o-nitro-p-methylaniline are dissolved in 150 cc. of water containing 25 cc. of 36% hydrochloric acid. 6.9 grams of sodium nitrite dissolved in water are then added while stirring and cooling to 0–10° C. to effect diazotization.

The resulting solution of diazonium compound is added slowly with stirring to an iced solution of 25.5 grams of N-β-hydroxypropyl-4-hydroxy-6-chloroquinolone-2 in 200 grams of water containing 30 grams of sodium carbonate. When the coupling reaction which takes place is complete, the reaction mixture is neutralized with hydrochloric acid, and the precipitated dye product is collected on a suction filter, washed with water, and dried. The azo dye compound obtained has the formula:

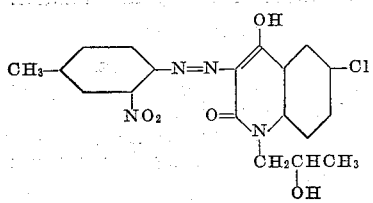

and colors cellulose acetate yellow shades.

Example 13

16.8 grams of o-nitro-p-methoxyaniline are dissolved in 150 cc. of water containing 25 cc. of 36% hydrochloric acid. While stirring and cooling to maintain a temperature of 0–10° C. 6.9 grams of sodium nitrite dissolved in water are added to effect diazotization.

26.5 grams of N-β-methoxyethyl-4-hydroxy-6-nitroquinolone-2 are added to 200 cc. of water containing 30 grams of sodium carbonate and to the resulting mixture is added with stirring and cooling the solution of diazonium compound prepared as described above. The temperature of the coupling reaction which occurs should not be allowed to rise above 10° C. When the reaction is complete, the mixture is rendered neutral to litmus by the addition of hydrochloric acid, and the precipitated dye product is recovered by filtration, washed with water, and dried. The dye compound obtained has the formula:

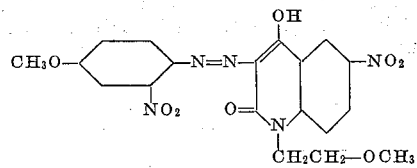

and colors cellulose acetate yellow shades.

Example 14

21.6 grams of 2-amino-5-nitrophenylmethyl sulfone are dissolved in 150 cc. of water containing 25 cc. of 36% hydrochloric acid and diazotized by adding 6.9 grams of sodium nitrite dissolved in water while stirring and cooling to maintain a temperature of 0–10° C.

23.2 grams of N-β-carboxamidoethyl-4-hydroxyquinolone-2 are added to 200 cc. of water containing 30 grams of sodium carbonate. To the resulting mixture is added the solution of diazonium compound prepared as described above while stirring and cooling the reaction mixture to keep its temperature below 10° C. When coupling is complete, the mixture is made neutral to litmus by adding hydrochloric acid and the precipitate formed is recovered by filtration, washed with water, and dried. The dye compound obtained has the formula:

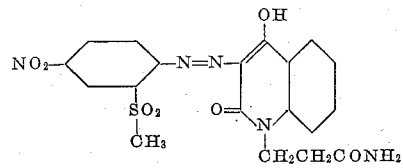

and colors cellulose acetate yellow shades.

Example 15

13.8 grams of m-nitroaniline are diazotized as described in Example 2 and the resulting solution of diazonium compound is added with stirring to an iced solution of 32.7 grams of N-β-carbomethoxyethyl-4-hydroxy-6-bromoquinolone-2 in 200 cc. of water containing 30 grams of sodium carbonate. A coupling reaction occurs with the evolution of heat which may necessitate further cooling to maintain a reaction temperature of 0–10° C. Upon completion of the coupling reaction the mixture is made neutral to litmus by adding hydrochloric acid and the precipitated dye compound is recovered by filtration, washed with water, and dried. The azo dye compound obtained has the formula:

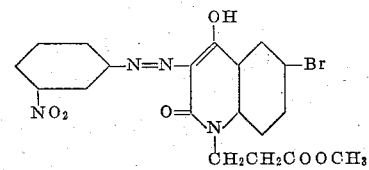

and colors cellulose acetate yellow shades.

The foregoing examples are intended merely to illustrate the manner in which the azo dyes included within the scope of my invention are prepared. It will be obvious to those skilled in the art that other specific dyes can be prepared by diazotizing any diazotizable monocyclic, non-sulfonated, aromatic amine of the benzene series and coupling the resulting diazonium compound with any 4-hydroxyquinolone-2 compound having the general formula hereinbefore illustrated by employing the procedure for the coupling reaction and recovery of the dye which I have described. Thus, the following dye compounds are readily prepared and dye cellulose acetate yellow shades.

16
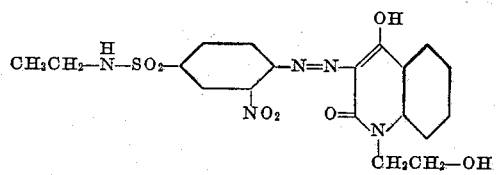

17
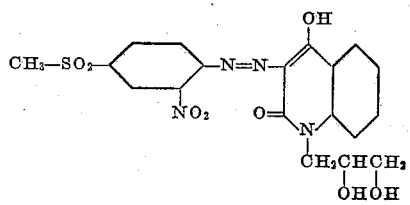

18
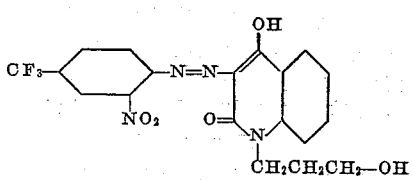

19
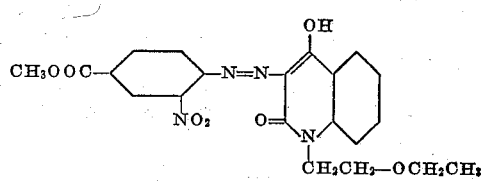

20
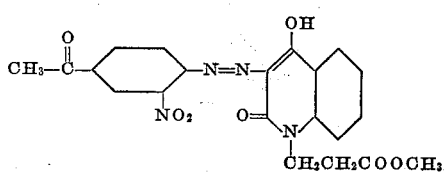

21.
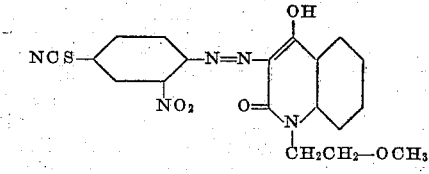

22.
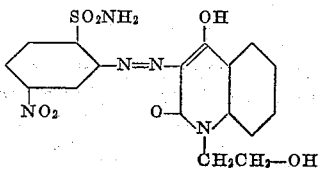

23.
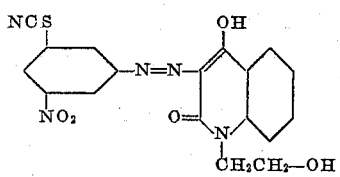

24.
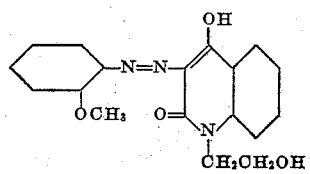

Several of the 4-hydroxyquinolone-2 compounds which I employ as coupling compounds have not hitherto been described. In order that my invention shall be more clearly understood several examples of the preparation of these compounds are set forth hereinafter.

Several different methods have been applied to the preparation of 4-hydroxyquinolone-2 compounds by prior workers in the field. The method which I prefer is based on the process disclosed in German Patent No. 287,803. This process comprises heating N-alkyl-anthranilic acid with acetic anhydride to obtain N-alkyl-4-hydroxyquinolone-2 compounds. Compounds of this type wherein the 5, 6, 7, and 8 positions contain substituents other than a carboxylic acid group or a sulfonic acid group (for example, a chlorine atom) are also prepared according to this process and are disclosed in U. S. Patent No. 1,969,463.

I have found that a compound having the formula:

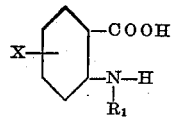

wherein $R_1$ and X have the meanings previously assigned to them when heated with acetic anhydride at 130° C. for about 30 minutes yields a 4-hydroxyquinolone-2 compound having the formula:

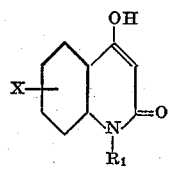

wherein $R_1$ and X have their previously given meanings.

The manner of preparation which I have just described will be further illustrated by the following examples.

*Example A*

36.2 grams of N-β-hydroxyethylanthranilic acid are added to 60 grams of acetic anhydride and the resulting solution is heated under reflux with stirring at about 130° C. for 30 minutes. The reaction mixture is then poured into 300 cc. of 10% sodium hydroxide solution and agitated to effect complete solution. The reaction product is precipitated by adding hydrochloric acid until the cold mixture is acid to congo red. The N-β-hydroxyethyl-4-hydroxyquinolone-2 is recovered in good yield by filtration, washed with cold water, and dried.

*Example B*

41.8 grams of N-β-methoxyethyl-4-methylanthranilic acid are dissolved in 60 grams of acetic anhydride and the resulting solution is heated under reflux with stirring at about 130° C. for 30 minutes. The reaction mixture is poured into 300 cc. of 10% sodium hydroxide solution and agitated to effect complete solution. The reaction product is precipitated by adding hydrochloric acid until the cold reaction mixture is acid to congo red following which it is recovered by filtration, washed with cold water, and dried. The N-β-methoxyethyl-4-hydroxy-7-methylquinolone-2 thus obtained in good yield can be coupled with the hereinbefore mentioned diazo compounds without further purification.

Example C 48.2 grams of N-β,γ-dihydroxypropyl-3-methoxy-anthranilic acid and 60 grams of acetic anhydride are heated together under reflux, with stirring, at 130° C. for 30 minutes. The reaction product is worked up and recovered in accordance with the procedure described in Example A. The N-β,γ-dihydroxypropyl-4-hydroxy-8-methoxyquinolone-2 thus obtained in good yield can be coupled with the hereinbefore mentioned diazo compounds without further purification.

Example D 60.4 grams of N-β-carbomethoxyethyl-5-bromo-anthanilic acid are dissolved in 60 grams of acetic anhydride and the resulting solution is heated under reflux with stirring at 130° C. for 30 minutes. The reaction product is worked up and recovered according to the procedure described in Example A. The N-β-carbomethoxyethyl-4-hydroxy-6-bromoquinolone-2 thus obtained in good yield is coupled with the before-illustrated diazo compounds to produce valuable azo dye compounds of my invention.

Example E 45.8 grams of N-γ-hydroxypropyl-6-chloroanthranilic acid and 60 grams of acetic anhydride are heated together for about 30 minutes at 130° C. The reaction product formed is then worked up and recovered in accordance with the procedure described in Example A. The N-γ-hydroxypropyl-4-hydroxy-5-chloroquinolone-2 thus obtained in good yield is coupled with the hereinbefore illustrated diazo compounds without further purification.

It will be apparent to one skilled in the art that any of the 4-hydroxyquinolone-2 compounds which I employ as coupling compounds can be prepared using the procedure illustrated in the foregoing examples.

Several of the N-substituted-anthranilic acid compounds which I employ in the preparation of the coupling compounds just described have not hitherto been disclosed. The preparation of the compounds having the formula:

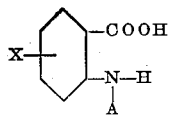

wherein A represents a hydroxyalkyl group having two to three, inclusive, carbon atoms or an alkoxyalkyl group having three to four, inclusive, carbon atoms is readily carried out using the procedure described in German Patent No. 163,043 for the preparation of N-β-hydroxyethyl-anthranilic acid. This method comprises boiling sodium anthranilate with ethylene chlorohydrin in water solution for two hours. The product is then dissolved in dilute sodium hydroxide solution and reprecipitated by acidifying the alkaline solution with hydrochloric acid. The following examples illustrate the method of preparing the above-depicted anthranilic acid derivatives.

Example F 34.6 grams of sodium 4-methylanthranilate and 20 grams of β-methoxyethyl chloride are added to 70 cc. of water and the resulting mixture is heated under reflux for two hours. On cooling, the crude product precipitates and is collected on a suction filter. The solid product is then dissolved in 100 cc. of 10% sodium hydroxide solution and reprecipitated by acidifying the alkaline solution with hydrochloric acid. The N-β-methoxyethyl-4-methylanthranilic acid is recovered by filtration, washed with water, and dried.

Example G 37.8 grams of sodium 3-methoxyanthranilate and 24 grams of β,γ-dihydroxypropyl chloride are dissolved in 80 cc. of water and the resulting solution is heated under reflux for about two hours. The crude reaction product which separates on cooling is recovered and redissolved in 10% sodium hydroxide solution. Hydrochloric acid is added to acidify the solution and the N-β,γ-dihydroxypropyl-3-methoxyanthranilic acid which precipitates is recovered by filtration, washed with cold water, and dried.

Example H 40.8 grams of sodium 6-chloroanthranilate, 20 grams of trimethylene chlorohydrin, and 90 cc. of water are heated under reflux for two hours. A good yield of N-γ-hydroxypropyl-6-chloroanthranilic acid is recovered from the reaction mixture using the procedure described in Example F.

Example I 31.8 grams of sodium anthranilate, 20 grams of 1-chloro-2-hydroxypropane and 80 cc. of water are heated together under reflux for two hours following which the reaction product is worked up and recovered in accordance with the procedure described in Example F. N-β-hydroxypropylanthanilic acid is thus obtained in good yield.

Compounds having the formula:

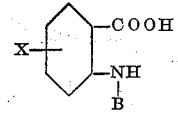

wherein B represents a β-carbomethoxyethyl group, a β-carboethoxyethyl group, or a β-carboxamidoethyl group and X has its previously given meaning are prepared by heating methyl acrylate, ethyl acrylate, and acrylamide respectively with anthranilid acid or an X-substituted derivative thereof in the presence of glacial acetic acid. The following examples illustrate the method of preparing these compounds.

Example J 27.4 grams of anthranilic acid, 30 grams of ethyl acrylate, and 5 cc. of glacial acetic acid are heated under reflux on a steam bath for 150 hours. The excess ethyl acrylate is removed by distilling the mixture with steam, and the residue is allowed to cool to crystallize the N-β-carboethoxyethylanthranilic acid which is then collected on a suction filter, washed with water, and dried.

Example K 43.2 grams of 5-bromoanthranilic acid, 30 grams of methyl acrylate, and 5 cc. of glacial acetic acid are heated together under reflux on a steam bath for 150 hours. The excess methyl acrylate is removed by distillation with steam and the aqueous residue is allowed to cool to crystallize the N-β-carbomethoxyethyl-5-bromo-anthranilic acid which is then recovered by filtration, washed with water and dried.

Example L 27.4 grams of anthranilic acid, 15 grams of acrylamide, and 20 cc. of glacial acetic acid are heated together under reflux on a steam bath for 150 hours. The reaction mixture is then poured into 100 cc. of 10% sodium hydroxide and agitated to dissolve the reaction product. The resulting solution is acidified by adding hydrochloric acid, and the precipitated N-β-carboxamidoethylanthranilic acid is recovered by filtration, washed with water and dried.

The azo dye compounds of my invention are readily applied to the coloration of textile materials made of or containing cellulose acetate, for example, by employing conventional direct dyeing methods. To form an aqueous dye bath or dispersion the dye in finely divided condition is advantageously first pasted with a suitable dispersing agent such as Turkey red oil, soap, sulfite cellulose solution, or an oleyl glyceryl sulfate and the resulting paste is dispersed in water. The material to be colored is immersed in the dye bath at a temperature approximating 45°–55° C. following which the temperature is gradually raised to 80°–90° C. and maintained at this point until dyeing is complete, usually one half hour to two hours. Upon completion of the dyeing operation the textile material is removed from the dyebath, washed with soap, rinsed well with water, and dried.

I claim:

1. The monoazo dye compounds having the formula:

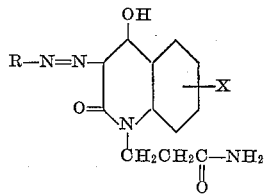

wherein R represents the residue of a monocyclic, non-sulfonated, aromatic nucleus of the benzene series and X stands for a member selected from the group consisting of a hydrogen atom, a chlorine atom, a bromine atom, a methyl group, a methoxy group, a trifluoromethyl group, and a nitro group.

2. The monoazo dye compounds having the formula:

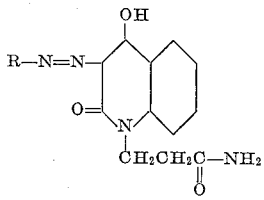

wherein R represents the residue of a monocyclic, non-sulfonated, aromatic nucleus of the benzene series.

3. The azo dye compound having the formula:

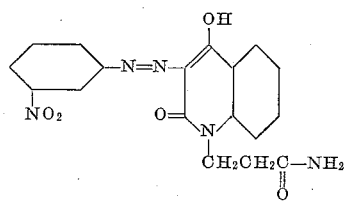

4. The azo dye compound having the formula:

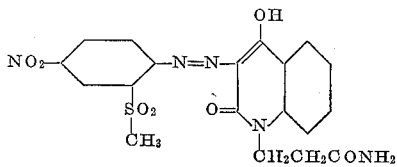

JOSEPH B. DICKEY.

REFERENCES CITED

The following references are of record in the file of this patent:

UNITED STATES PATENTS

| Number | Name | Date |
|---|---|---|
| 1,969,463 | Holzack et al. | Aug. 7, 1934 |
| 2,323,315 | Dickey et al. | July 6, 1943 |
| 2,364,347 | Dickey et al. | Dec. 5, 1944 |
| 2,391,886 | Dickey | Jan. 1, 1946 |